United States Patent
Ruetz

[19]

[11] Patent Number: 5,898,596
[45] Date of Patent: Apr. 27, 1999

[54] ADDER WHICH EMPLOYS BOTH CARRY LOOK-AHEAD AND CARRY SELECT TECHNIQUES

[75] Inventor: Peter Ruetz, Redwood City, Calif.

[73] Assignee: Synopsys, Inc., Mountain View, Calif.

[21] Appl. No.: 08/788,619

[22] Filed: Jan. 24, 1997

Related U.S. Application Data

[60] Provisional application No. 60/010,496, Jan. 24, 1996.

[51] Int. Cl.$^6$ .............................. G06F 17/50; G06F 7/50
[52] U.S. Cl. ..................... 364/490; 364/488; 364/785; 364/786.01; 364/787.01
[58] Field of Search .................... 364/488, 489, 364/490, 785, 786.01, 786.02, 787.01, 787.04

[56] References Cited

U.S. PATENT DOCUMENTS

| | | | |
|---|---|---|---|
| 5,208,769 | 5/1993 | Mandava | 364/766 |
| 5,229,959 | 7/1993 | Scriber et al. | 364/786 |
| 5,272,662 | 12/1993 | Scriber et al. | 364/788 |
| 5,285,406 | 2/1994 | Lynch et al. | 364/788 |
| 5,377,122 | 12/1994 | Werner et al. | 364/488 |
| 5,508,952 | 4/1996 | Kantabutra | 364/787 |
| 5,638,313 | 6/1997 | Chu | 364/760 |

*Primary Examiner*—Vincent N. Trans
*Attorney, Agent, or Firm*—Wagner, Murabito & Hao

[57] ABSTRACT

The hybrid adder of the present invention uses stages of carry select functions to provide serial carries and a carry look-ahead tree structure to compute the final carries in parallel. The longer the carry select stages become, the slower and smaller the hybrid adder gets by reducing the size of the carry tree. By making the carry select stages shorter, the faster and larger the adder gets by increasing the size of the carry tree. The increased flexibility of the resulting hybrid adder gives the circuit designer a greater range of possible designs to achieve optimum size and speed performance. A preferred process for selecting optimum stage lengths is also described. The method for designing the hybrid adder is preferably carried out using a logic synthesis software program.

3 Claims, 11 Drawing Sheets

ADDER WHICH EMPLOYS BOTH CARRY LOOK-AHEAD AND CARRY SELECT TECHNIQUES

This application claims the benefir of U.S. provisional application No. 60/010,496 filed Jan. 24, 1996.

TECHNICAL FIELD

This invention relates to an adder formed using a computer aided logic synthesis technique or any other technique and a method for determining the structure of the adder.

BACKGROUND ART

Complex integrated circuits (ICs) are typically designed using a CAD system. The CAD system allows the user to design a circuit using pre-designed circuit building blocks from a library. One basic structure frequently designed using logic synthesis tools is an adder for adding binary numbers of any bit width. Common adder designs which would be incorporated into the library are ripple adders, carry-select adders, and carry look-ahead adders. Subsets of adders include comparators (only determines carry) and counters (increments by 1).

Equation 1 below is the well known equation for generating a sum bit Si for two binary numbers $X_i$ and $Y_j$, for the bit position i, where $C_{i-1}$ is the carry bit from the next lower significant bit position.

$$S_i = (X_i \hat{\ } Y_i) \hat{\ } C_{i-1} \qquad \text{Eq. 1}$$

In this disclosure, the symbol "^" is a logical exclusive OR (XOR), the symbol "*" is a logical AND, and the symbol "+" is a logical OR.

The equations presented herein are also shown or described in the book *Computer Architecture: A Quantitative Approach*, Appendix A, by David A. Patterson and John L. Hennessy, ISBN 1-55860-069-8, incorporated herein by reference.

Ripple adders are so named because the carry bit for a pair of binary numbers must be calculated before the sum of the next higher significant bits can be calculated. This delay in generating each carry bit ripples along the ripple adder so that the total delay is proportional to the width of the binary numbers to be added.

Ripple adders are slow, but simple, and take up relatively little silicon surface area.

A more complex adder structure which uses a greater amount of silicon surface area than the ripple adder for the same adder bit width is shown in FIG. 1 and is generally called a carry select adder is approximately proportional to the square root of the bit width, assuming uniform input signal arrival times and optimal stage lengths.

FIG. 1 shows a 5-bit carry select adder having two stages 3 and 4, stage 3 being comprised of two adders 6 and 7, and stage 4 being comprised of three adders 8, 9, and 10. The outputs of the last adder in a stage (adders 7 and 10) are applied to a multiplexer 12 or 14.

Both stages 3 and 4 of FIG. 1 begin computing in parallel, with the adders in each stage computing in series. The final sum bits (S0–S4) and carry bit ($C_{out}$) are not valid until the carry input ($C_{in0}$ and $C_{in1}$) saves for each stage. Two possible sum bits for each adder 6–10 and two possible carry bits for each adder 6–10 are calculated before the carry input bit arrives for the stage. The carry input ($C_{in0}$) for stage 3 can be set to zero if there is no carry into stage 3. Stage 4 cannot provide its final sum bits and carry output ($C_{out}$) bit until stage 3 has output its carry bit ($C_{in1}$) by the appropriate control of multiplexer 12. Hence, the delay by stage 3 in calculating the carry bit $C_{in1}$ is added to the accumulated delays by the multiplexers when calculating the final carry bit $C_{out}$. Such delay, however, is much less than the conventional ripple adder.

The various outputs of each adder 6–10 and multiplexers 12 and 14 are calculated as expressed in the well-known equations below.

The sum for bit i in stage k can be computed from:

$$s1_{k,i} = (X_{k,i} \hat{\ } Y_{k,i}) \hat{\ } cl_{k,i-1} \qquad \text{Eq. 2}$$

(final sum bit in stage k, bit i, for carry in=1)

$$s0_{k,i} = (X_{k,i} \hat{\ } Y_{k,i}) \hat{\ } c0_{k,i-1} \qquad \text{Eq. 3}$$

(final sum bit in stage k, bit i, for carry in=0)

The carry bit output (c0, c1) from each adder 6–10 can be computed from:

$$c1_{k,i} = (X_{k,i} * Y_{k,i}) + c1_{k,i-1} * (X_{k,i} + Y_{k,i}) \qquad \text{Eq. 4}$$

(carry bit for stage k, bit i, for carry in=1)

$$C0_{k,i} = (X_{k,i} \hat{\ } * Y_{k,i}) + c0_{k,i-1} * (X_{k,i} + Y_{k,i}) \qquad \text{Eq. 5}$$

(carry bit for stage k, bit i, for carry in=0)

The carry bits applied to the first adder 6 and 8 in each stage are fixed as:

$$c1_{k,-1} = 1 \text{(input bit } c1\text{)} \qquad \text{Eq. 6}$$

$$c0_{k,-1} = 0 \text{(input bit } c0\text{)} \qquad \text{Eq. 7}$$

The final sum output (S0–S4) selected for each adder 6–10 based on the carry-in bit ($C_{in}$) for that stage is follows:

$$S_{k,i} = s1_{k,i} \text{ if } C_{in} = 1 \qquad \text{Eq. 8}$$

$$s0_{k,i} \text{ if } C_{in} = 0$$

(sum in stage k, bit i, as selected by the carry in for that stage)

The output carry bit from a stage k is as follows:

$$C_k = cl_{k,n-1} \text{ if } C_{in} = 1 \qquad \text{Eq. 9}$$

$$C0_{k,n-1} \text{ if } C_{in} = 0$$

(carry out from stage k with n bits, as selected by the carry in (e.g., $C_{in0}$ or $C_{in1}$) for that stage)

The equations above are presented in a summary fashion and would be readily understood, and already known, to those skilled in the art. Additional detail is presented in the book *Computer Architecture: A Quantitative Approach*, previously mentioned.

In a carry look-ahead adder (CLA), the carry signals for each bit are computed in parallel in a tree structure. One type of CLA is shown in FIG. 2. The tree structure can be made to have more logic per stage (bigger), but fewer stages (faster), resulting in a bigger, faster adder, or less logic per stage (smaller), but more stages (slower) for a smaller, slower adder. A CLA should be designed to compute the carries ($C_i$) for each bit position as fast as possible given the amount of silicon surface area allocated. Usually, a tree is built with $\log_2$ (n) stages, where n is the bit width of the numbers to be added. If n is not a power of 2, then the number of stages is $\log_2$ of the next higher power of 2. At each stage (k), the CLA tree computes a generate signal (G) and a propagate signal (P) for bit i, where:

$$G_{k+1,i} = G_{k,i} + (P_{k,i} * G_{k,i-2^k})$$ Eq. 10

$$P_{k+1,i} = P_{k,i} * P_{k,i-2^k}$$ Eq. 11

Each block 22 making up the tree performs the following logical operations on its inputs to generate $G_{out}$ and $P_{out}$:

$$G_{out} = G_{in} + (P_{in} * G0_{in})$$ Eq. 12

$$P_{out} = P_{in} * P0_{in}$$ Eq. 13

The G signals indicate that there will definitely be a carry bit at bit i; the P signals indicate that there will be a carry at bit i only if there is a carry at bit position $i-2^k$. For the first stage (k=0) we set:

$$G_{0,i} = X_i * Y_i$$ Eq. 14

$$P_{o,i} = X_i + Y_i$$ Eq. 15

The designer just needs to build enough stages (k) to ensure that the CLA structure computes all of the carries. In general, only $\log_2(n)$ stages (assuming n is a power of 2) are needed so delay is related logarithmically to the bit width of the adder. The value of $G_i$ in the last stage for bit i is a carry value needed to compute a sum using the equation 1 above.

The CLA of FIG. 2 shows the carry circuitry for a four-bit carry look-ahead adder. The four blocks 20 at the bottom of FIG. 2 generate $G_i$ and $P_i$ based on equations 14 and 15 above. The remaining blocks 22 are identical to one another and perform equations 10–13. The two stages of carry tree generate the four final carry bits $C_0$–$C_3$ which are used to compute the final sum bits in accordance with equation 1. The adder portion which uses $X_i$, $Y_i$, and $C_{i-1}$ in equation 1 to generate a sum $S_i$ may optionally be incorporated in blocks 20. This CLA tree structure is easily extended to any number of bits. The speed advantages of the CLA are, of course, increased as the bit width becomes greater, while the size disadvantages of the CLA worsen as the bit width becomes greater.

The book *Computer Architecture: A Quantitative Approach*, previously mentioned, provides equivalent equations for a CLA adder using a different format and an equivalent CLA tree structure using an arrangement different from that shown in FIG. 2 but performing identical logic functions. FIGS. 3A, 3B, and 3C illustrate the CLA tree adder described in the above-mentioned book. The structures of FIGS. 3A–3C are presented to illustrate how a CLA structure can be implemented in a variety of ways yet still carry out the same logical functions performed by the CLA tree described with respect to equations 10–15.

FIG. 3A shows a first part of a CLA tree for an 8-bit adder, where the bits of the two numbers to be added (numbers a and b) are inputted into the top of the CLA tree into logic blocks 1. The logic functions performed by the logic blocks 1 are shown at the bottom of FIG. 3A. The outputs of the blocks 1 are input into the four input terminals of the blocks 2, performing the logic functions depicted at the bottom of FIG. 3A. The diagram of FIG. 3A would be readily understood by those skilled in the art. The diagram of FIG. 3A illustrates the generation of the various G and P values, where the G signals indicate that there will definitely be a carry bit at a particular bit position, and the P signals indicate that there will be a carry at a particular bit position only if there is a carry bit at another bit position.

FIG. 3B illustrates other functions performed by the resulting CLA tree to generate carry bits, where a carry-in bit $c_0$ is applied to the input of the CLA tree. The logic function performed by the various blocks shown in FIG. 3B is illustrated at the bottom of FIG. 3B.

FIG. 3C shows the combination of the structures shown in FIGS. 3A and 3B to form a complete CLA tree. The functions performed by each of the logic blocks A and B in FIG. 3C are illustrated at the bottom of FIG. 3C using conventional logic symbols understood by those of ordinary skill in the art.

Other CLA and carry select adder structures are described in U.S. Pat. Nos. 3,700,875; 4,764,888; 5,047,976; 5,396,445; 4,464,729; 5,122,982; 5,276,635; 5,278,783; 4,525,797; 5,283,755; and 5,027,312, all incorporated herein by reference.

Speed Versus Area Considerations

When a user of a logic synthesis tool is designing an adder in a larger circuit, the parameters which dictate the optimum adder design for the particular application include bit width, maximum tolerable delay, area constraints, input arrival time skews and other well-known considerations. If, during a timing analysis of a circuit design, it is found that the adder is too slow or too large, the adder must be changed to a different design, such as by converting a ripple adder to a carry select adder, or a carry select adder to a CLA, or vice versa. The possible choices of adders is relatively limited, and therefore the user of the logic synthesis tool is only given a choice of adder designs which do not precisely meet the user's speed vs. are requirements.

What is needed is a more flexible adder synthesis software program for developing a new adder structure which has a speed us area lying somewhere between a conventional carry select adder and a carry look-ahead adder of the same bit width.

DISCLOSURE OF THE INVENTION

The present invention combines various aspects of carry look-ahead adders and carry select adders to provide more design possibilities for those attempting to implement an adder structure having selected parameters. The resulting structure may be implemented in a gate array or other hardware form to have a speed vs. area lying somewhere between a conventional carry select adder and a carry look-ahead adder of the same bit width.

The hybrid adder of the present invention uses stages of carry select functions to provide serial carries and a carry look-ahead tree structure to compute the final carries in parallel. The longer the carry select stages become, the slower and smaller the hybrid adder gets by reducing the size of the carry tree. By making the carry select stages shorter, the faster and larger the adder gets by increasing the size of the carry tree. The increased flexibility of the resulting hybrid adder gives the circuit designer a greater range of possible designs to achieve optimum size and speed performance.

In addition, the carry select stage lengths can be made non-uniform to accommodate skewed arrival times of the inputs. Slow bits may be connected to the shorter stages, while faster bits may be connected to the longer stages. The hybrid adder thus reduces delay for critical inputs while using up relatively little area.

In one embodiment of a 4-bit hybrid adder, two carry select stages are used, each two bits wide. The output of each stage is connected to the input of a single stage carry tree. No multiplexers are used. Additional levels of the carry tree would normally be used as the bit width increases. The speed vs. area benefits of the hybrid adder increase for larger bit width adders.

A method for selecting the optimum design of the hybrid adder is also described, where the method is utilized in a logic synthesis program.

BRIEF DESCRIPTION OF THE DRAWINGS

The accompanying drawings, which are incorporated in and form a part of is specification, illustrate embodiments of the invention and, together with the description, serve to explain the principles of the invention.

Prior art

Prior art

Prior art

Prior art

Prior art

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. En other instances, well known methods, procedures, components, and circuits have not been described in detail as not to unnecessarily obscure aspects of the present invention.

Figure 4:
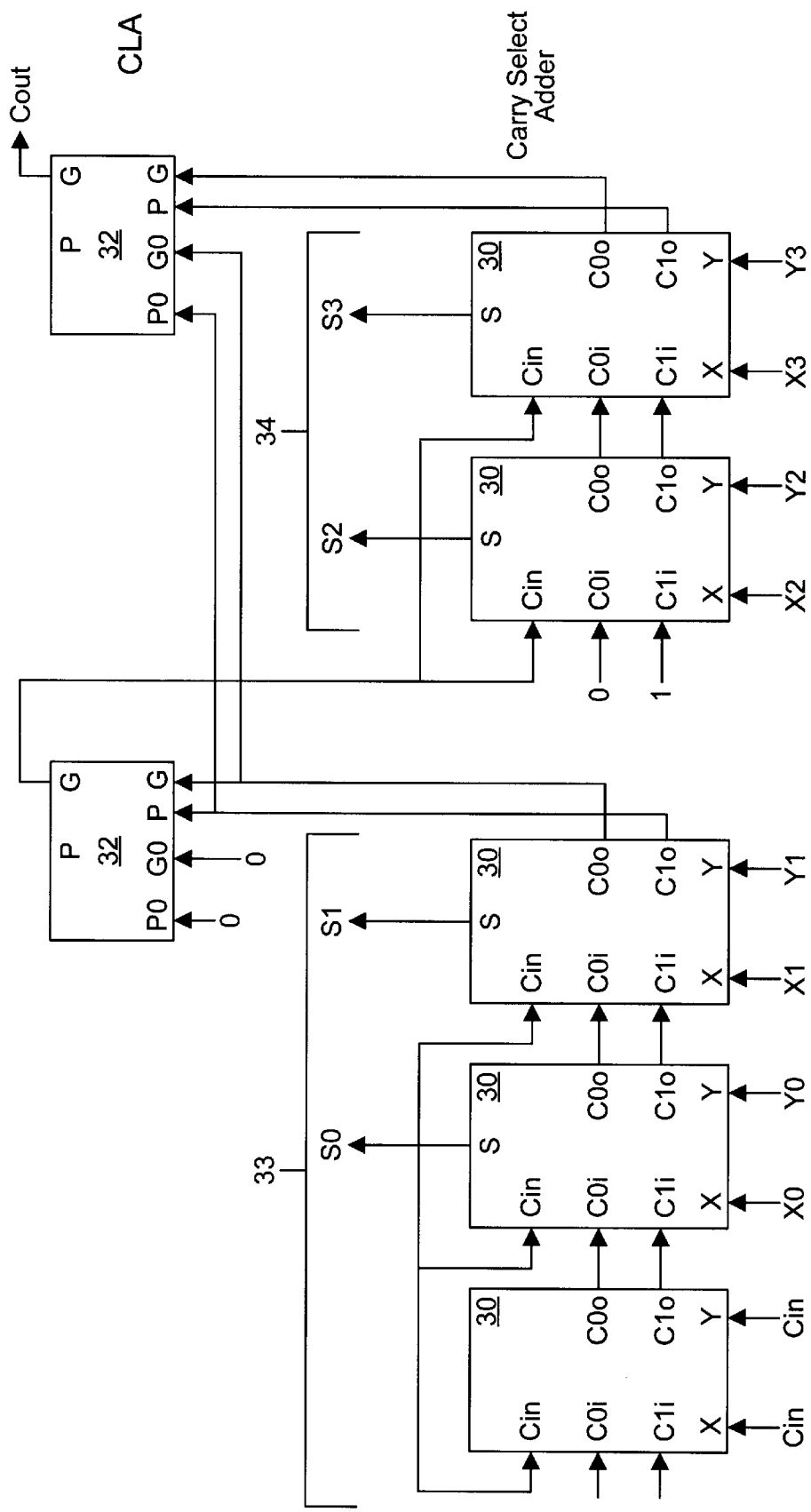
FIG. 4 illustrates one embodiment of a 4-bit hybrid adder in accordance with the invention.

FIG. 4 illustrates an embodiment of the invention for a 4-bit hybrid adder having a carry input. Larger hybrid adders become much more complex and would be impractical to depict in detail graphically. One skilled in the art will understand, after reading this disclosure, how the techniques used to create the hybrid adder structures of FIGS. 4–7 may be applied to create other hybrid adder designs having speed vs. area characteristics optimized for a particular application.

Figure 1:
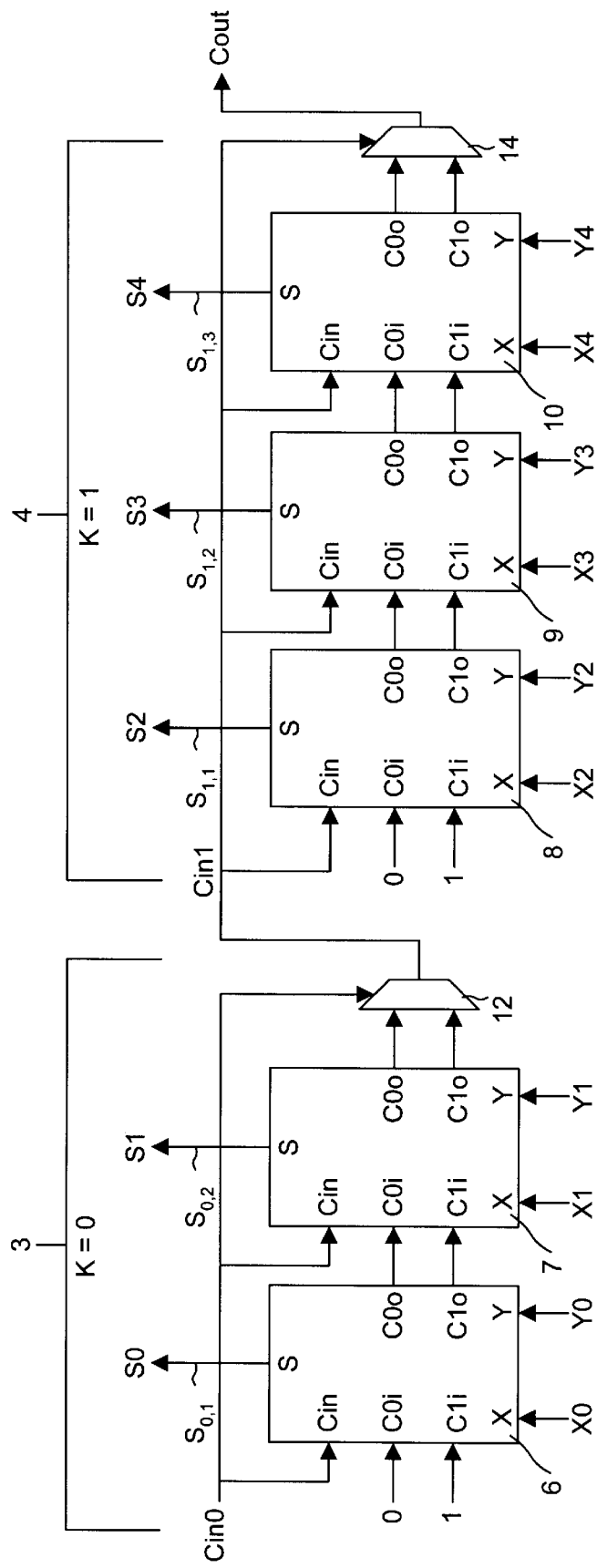
FIG. 1 is a block diagram of a conventional carry select adder.
Figures 5, 6:
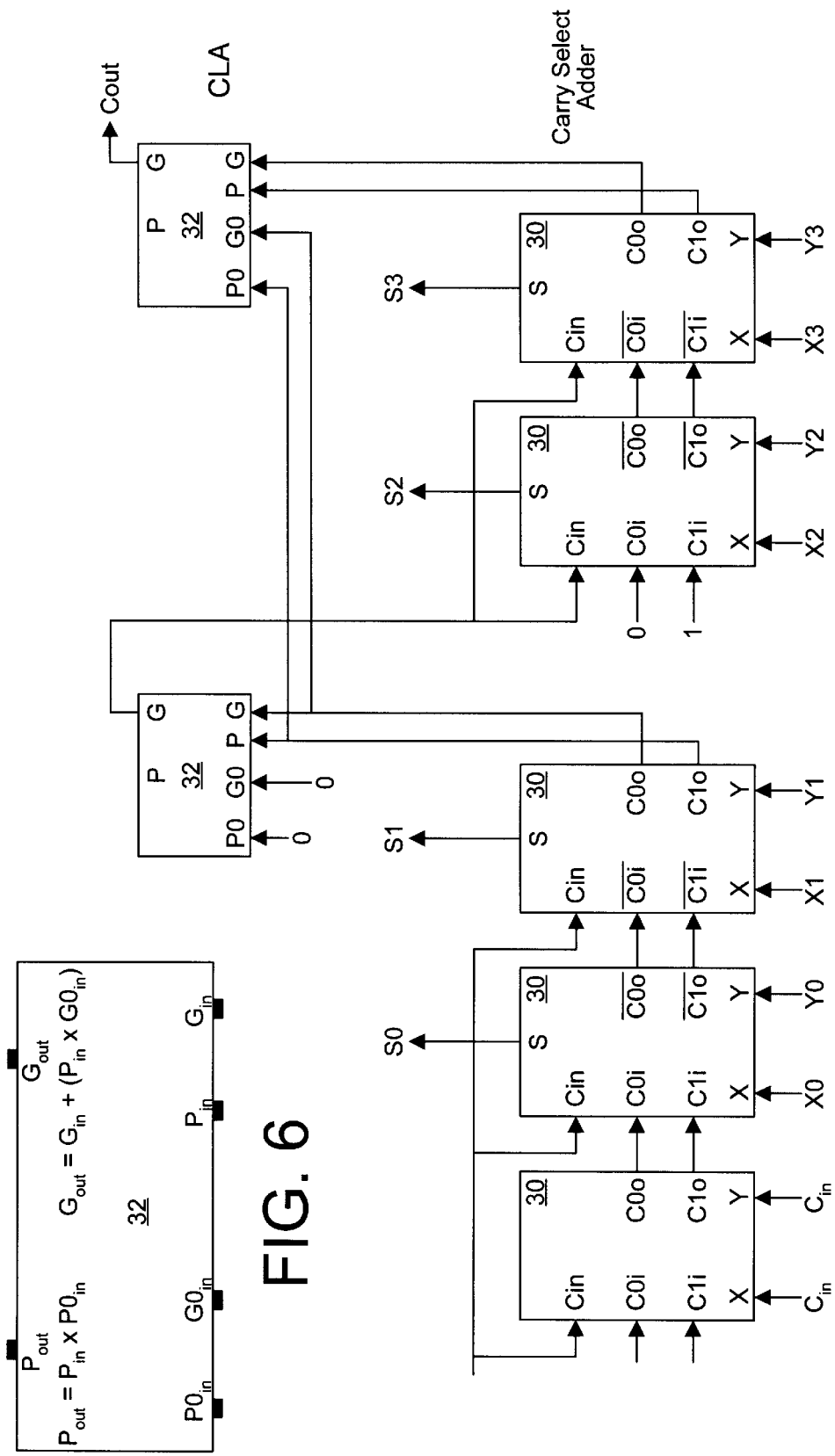
FIG. 5 illustrates an embodiment of a 4-bit hybrid adder in accordance with another embodiment of the invention.
FIG. 6 illustrates a single functional block used in the CLA tree of the hybrid adder and the logical operations performed on the input signals.

Each logic block 30 in FIG. 4 may be identical to any one of adders 6–10 in FIG. 1. Alternatively, as shown in FIG. 5, to reduce the number of inverters used in a logic block 30 and thus to increase its speed, the C0 and C1 outputs of alternate logic blocks 30 in a stage are left inverted, and the logic blocks 30 receiving these inverted signals have inverting input ports C0 and C1. Blocks 30 perform carry select equations 1 through 9 previously described.

Further, the circuitry in the first logic block 30 in the first carry select adder stage 33 may be greatly simplified since, in the example of FIG. 4, no sum bit is generated in the first logic block 30, three out of the five inputs are fixed values, and the other two inputs are the same (i.e., $C_{in}$). Additionally, the circuitry in all logic blocks 30 in the first carry select adder stage 33 may be simplified if the bit applied to the $C_{in}$ input is fixed, as in FIG. 4.

A second carry select adder stage 34 is also shown in FIG. 4.

The carry look-head adder (CLA) portion of the hybrid adder of FIG. 4 is made up of logic blocks 32.

Figure 2:
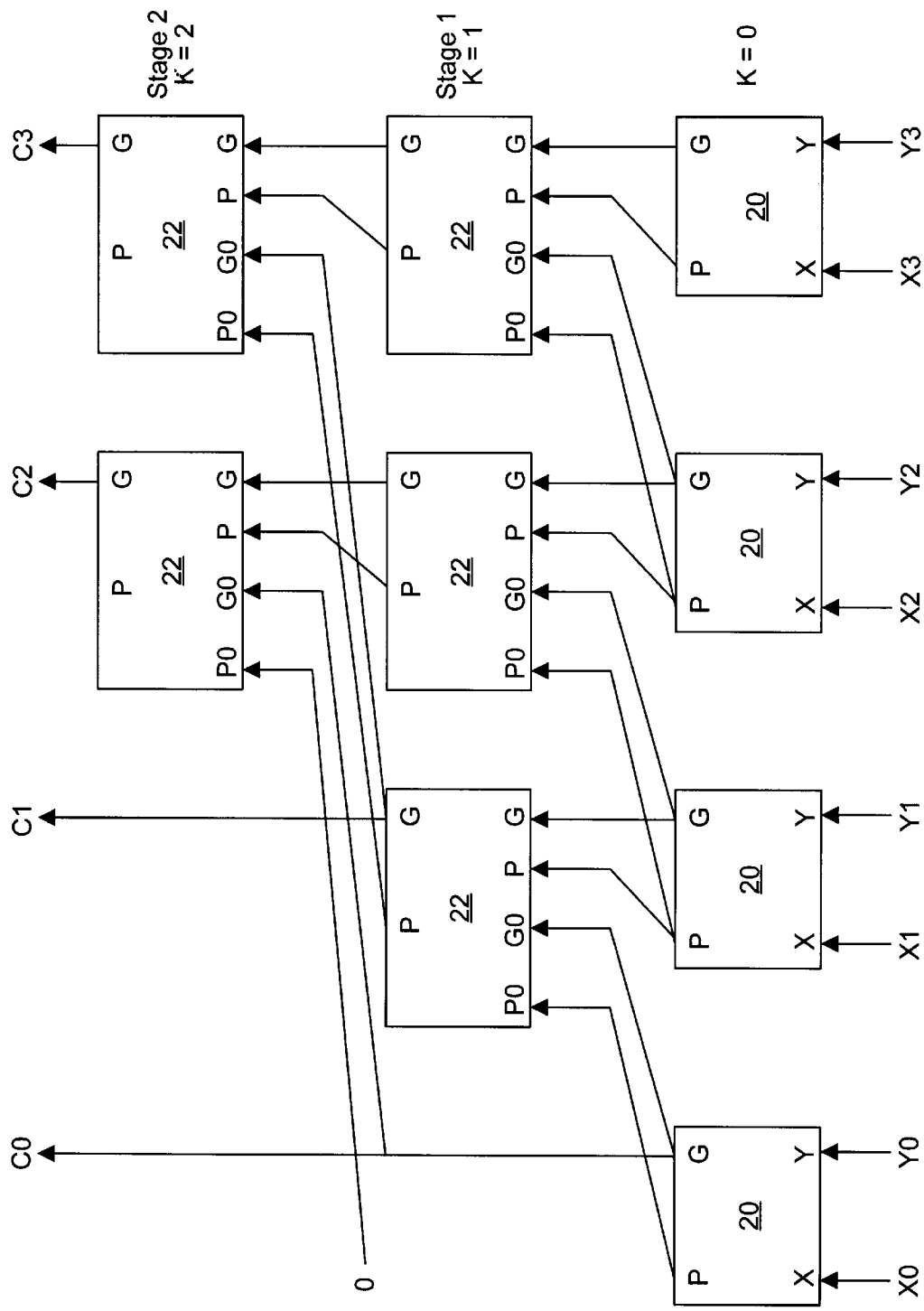
FIG. 2 is a block diagram of a conventional carry look-ahead adder (CLA).
Figure 3A:
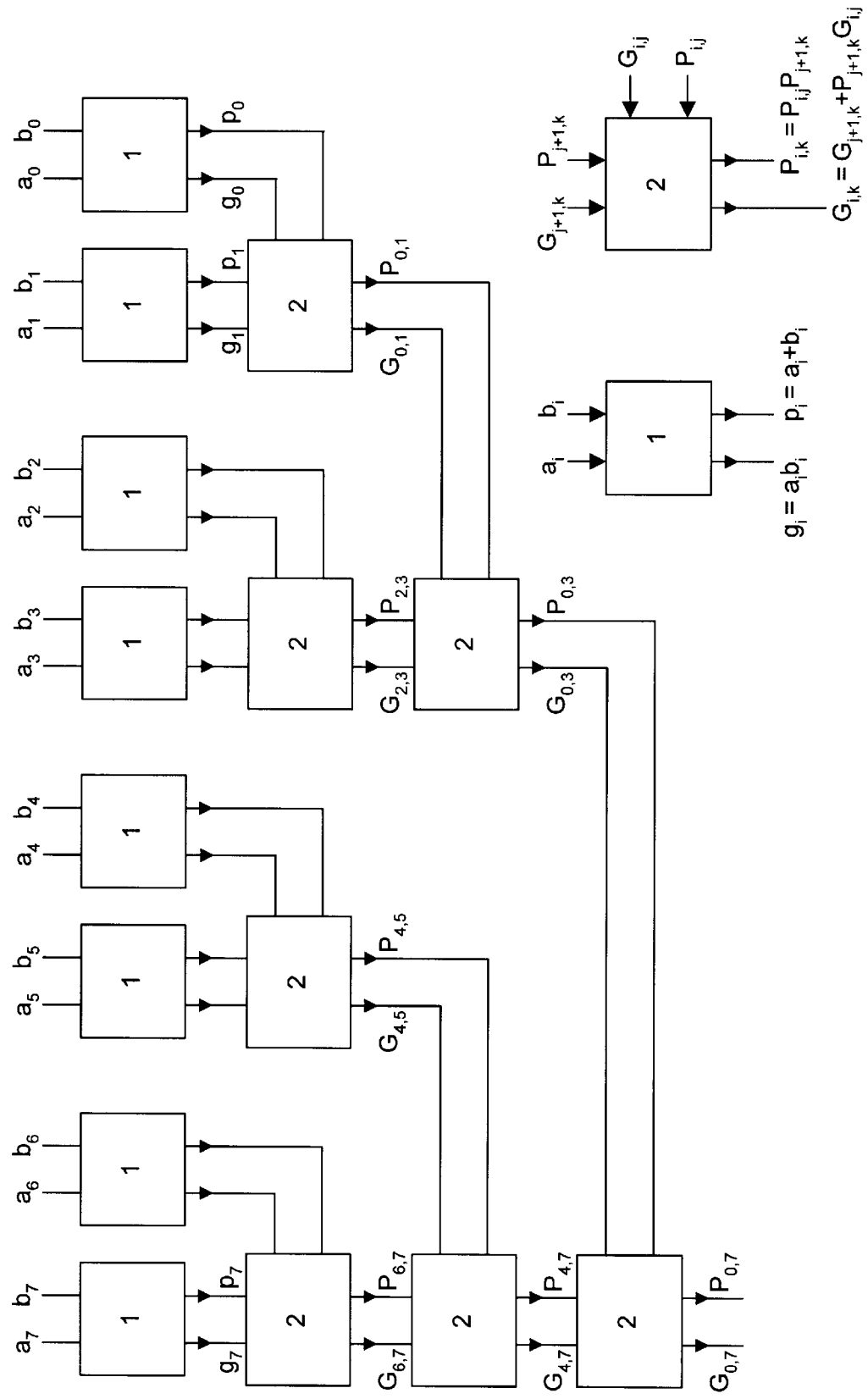
FIG. 3A is a block diagrams illustrating the construction of another conventional CLA.
Figure 3B:
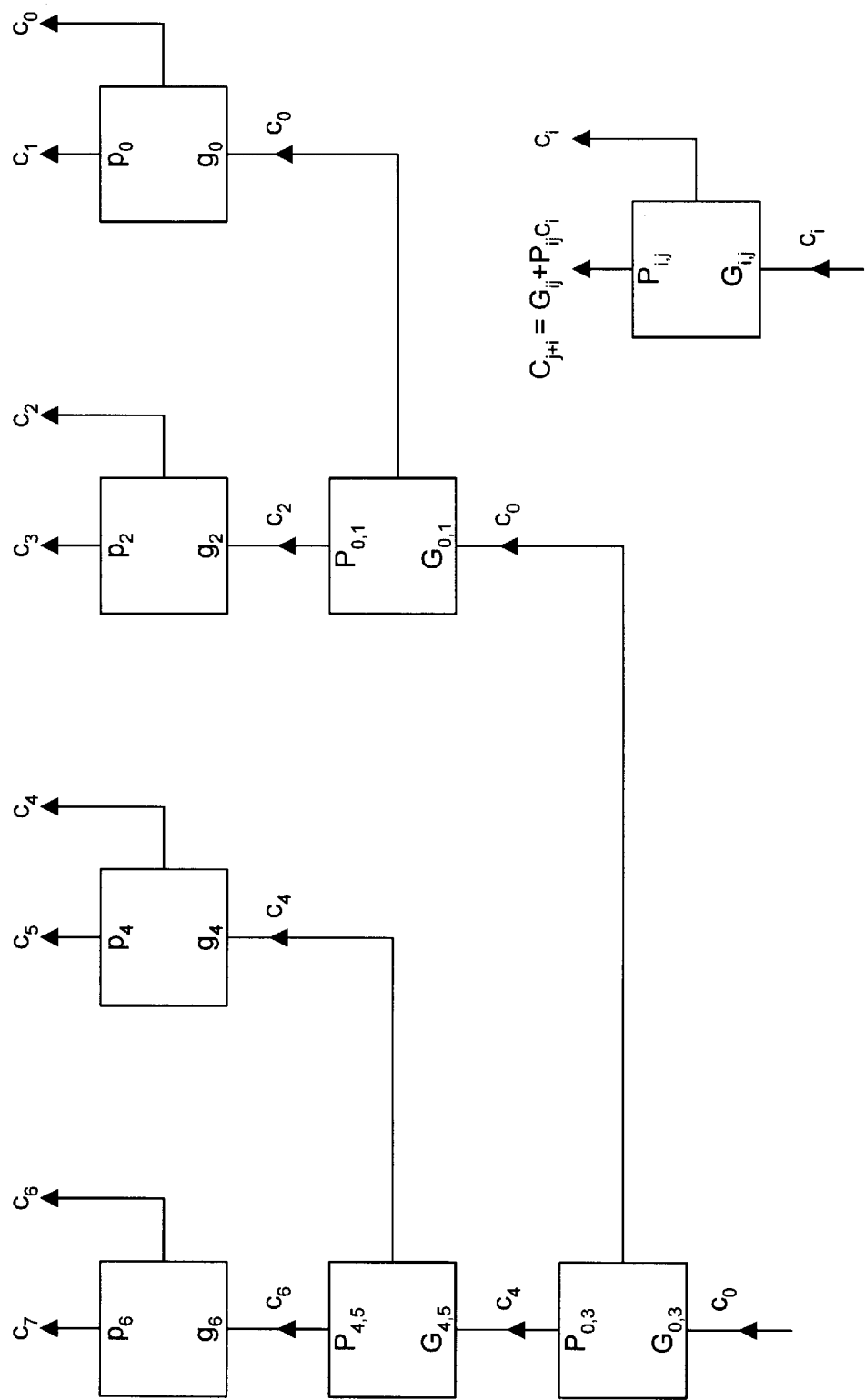
FIG. 3B is a second block diagram illustrating the construction of the conventional CLA from prior art FIG. 3A.
Figure 3C:
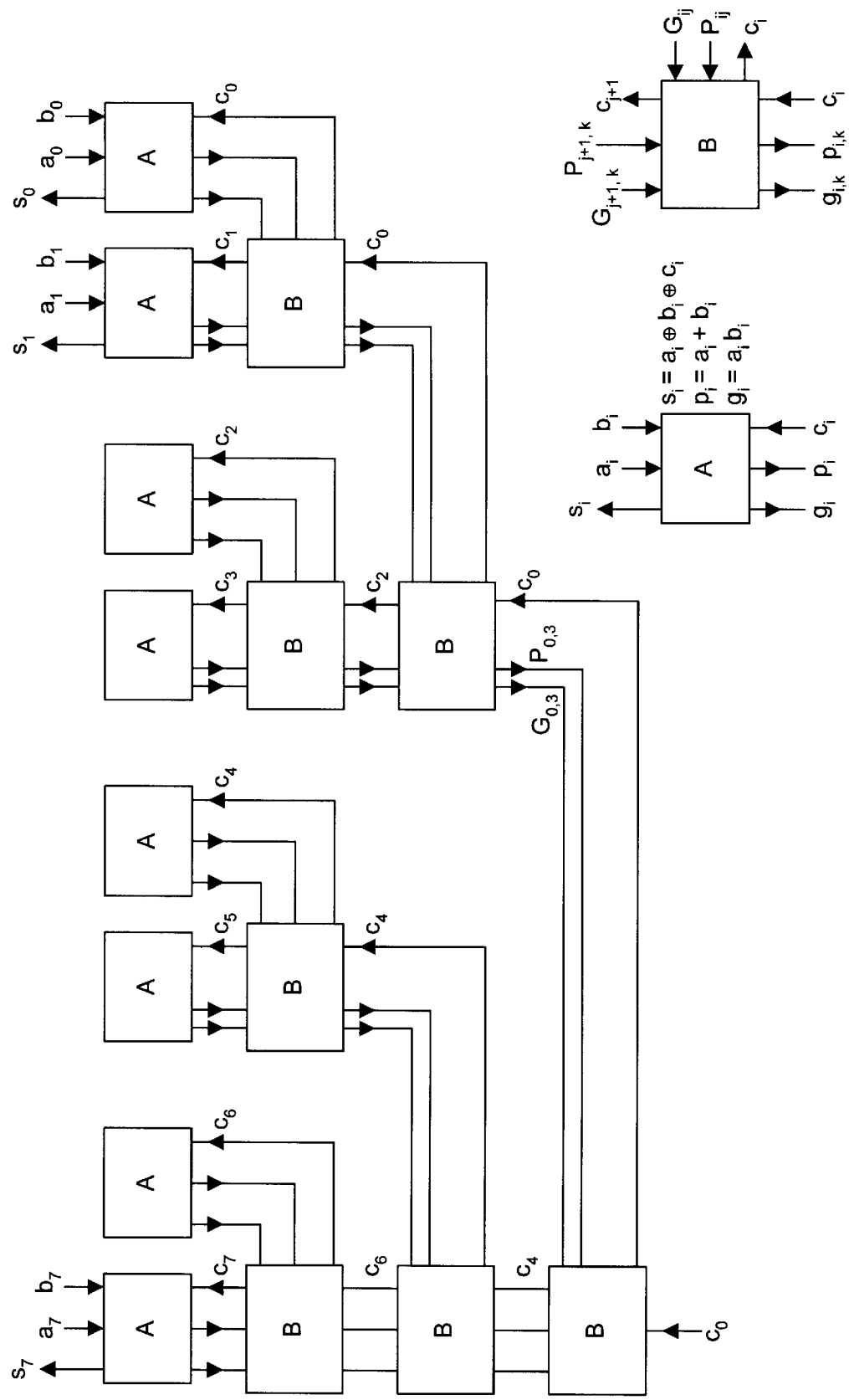
FIG. 3C is a third block diagram illustrating the construction of the conventional CLA from prior art FIG. 3A.

Each logic block 32 in FIG. 4 may be identical to each CLA block 22 in FIG. 2 for implementing the carry look-ahead equations 12 and 13 previously described.

In a preferred embodiment, if the CLA portion were composed of multiple stages, alternate stages would have inverting inputs and alternate stages would have inverted outputs (which would then be inverted by the inverting inputs) to reduce the number of inverters used in each CLA block 32. This is similar to inverting alternate C0 and C1 inputs and outputs as described with respect to FIG. 5 to reduce the number of inverters used in the carry select portion. Thus, two types of blocks 30 and two types of blocks 32 may be used to speed up processing by eliminating inverting buffers.

FIG. 6 illustrates a single block 32 with equations 12 and 13 printed therein. One skilled in the art would understand how to implement such logic blocks 30 and 32 by either conventional transistor circuit techniques or by using a logic synthesis software program to create the circuit.

Given the various equations previously described which are logically performed by each of the blocks 30 and 32 shown in FIG. 4, one skilled in the art can easily confirm the proper operation of the circuit of FIG. 4 in adding two 4-bit numbers.

Although the increase in speed of the hybrid adder of FIG. 4 relative to the carry select adder of FIG. 1 may not be readily appreciated for a 4-bit wide adder, the differences become increasingly apparent as the adder width is increased, such as to 32 bits and beyond. These differences will be presented later with respect to FIGS. 11 and 12. For a wide range of bit widths, the hybrid adder provides an adder having speed and size characteristics somewhere between the relatively slow and simple carry select adder of FIG. 1 and the very complex yet fast carry look-ahead adder of FIG. 2. This provides a high degree of flexibility to the circuit designer who can now optimize the speed and area of an adder to meet the needs of the IC to be ultimately fabricated.

As can be seen from a comparison of FIG. 4 to the carry select adder of FIG. 1, multiplexers 12 and 14 in FIG. 1 are no longer used in the hybrid adder of FIG. 4. Otherwise, the carry select adder lower portion of the hybrid adder is similar to that shown in FIG. 1. Additionally, the CLA portion of the hybrid adder which is used to calculate carry bits will be shown to be similar to a carry tree structure, such as shown in FIGS. 2 and 3A–3C. This division between the carry select adder and CLA portions of the hybrid adder is better illustrated in the hybrid adder is better illustrated in the hybrid adder 40 in FIG. 7, which shows carry select adder stages 42 through 46.

Each of carry select adder stages 42–46 may be any bit length, from one bit in a stage to five or more bits in a stage. Within each stage 42–46, blocks 30 (FIG. 4) are interconnected such as illustrated in FIGS. 1 or 4 so as to output the carry output bits C1 and C0 from each stage 42–46.

Figure 7:
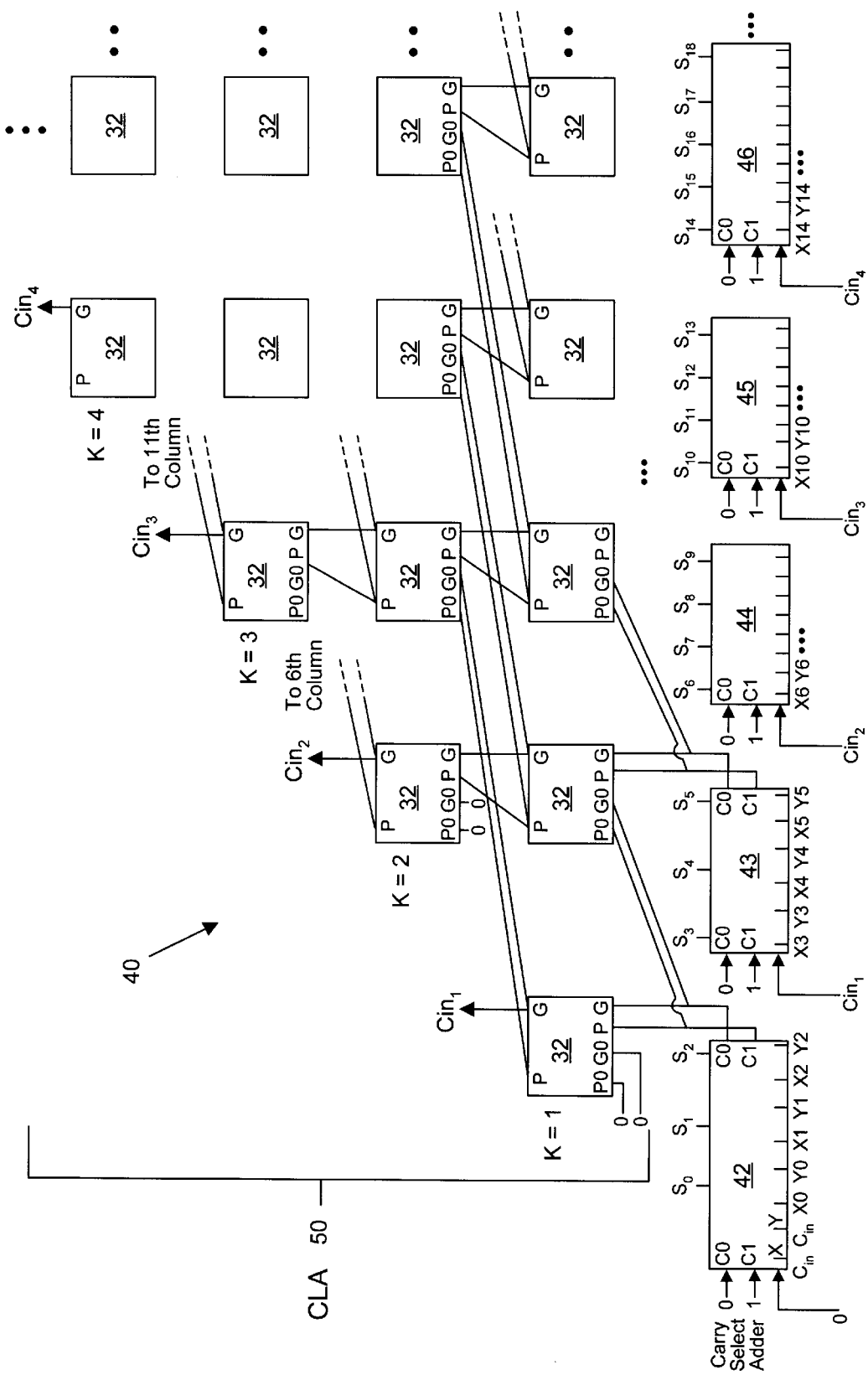
FIG. 7 is a simplified block diagram of a hybrid adders can of any bit size using the CLA tree of FIG. 2.

In prior art carry select adders, each stage had to wait for a preceding stage to generate a carry-in bit for the next stage in order for that next stage to select its final carry-in bit for a subsequent stage. However, using the present invention, the carry-in bits for each stage 42–46 of the carry select adder portion of FIG. 7 are determined using carry tree 50, where this carry tree 50 can assume any form consistent with well known carry tree structures. The interconnections between the various carry select adder stages 42–46 and the CLA blocks 32 in the CLA stages are presented in simplified form but are consistent with the CLA tree structure used in conventional CLA trees, such as that shown in FIG. 2. The interconnections between the various CLA blocks 32 in the tree 50 are dictated by equations 10 and 11. The carry outputs obtained at the G terminals of blocks 32 are connected to the appropriate carry-in terminals of stages 42–46, as indicated in FIG. 7.

In the first stage of the carry tree 50, the inputs into the $P_{in}$ and $G_{in}$ terminals of the blocks 32 are the carry outputs C0 and C1 of the corresponding carry select adder stage 42–46. These carry bits C0 and C1 are also applied to the $P0_{in}$ and $G_{in}$ terminals of the blocks 32 are the carry outputs C0 and C1 of the corresponding carry select adder stage 42–46. These carry bits C0 and C1 are also applied to the $P0_{in}$ and $G0_{in}$ of blocks 32 as illustrated graphically in FIG. 7 and in accordance with equations 10 and 11.

The hybrid adder employs a serial-parallel structure, where there is a serial structure within each of the carry select adder stages and parallel propagation of the carry bits between the stages due to the CLA tree.

As illustrated in FIG. 7, there can be any number of carry select adder stages, and the width and height of the carry tree 50 varies depending upon the number of carry select adder stages. The size of each stage 42–46 may be increased to effectively reduce the required carry tree 50 size, which will result in a slower, but smaller, adder. This allows more flexibility in selecting the size and performance characteristics of the hybrid adder to optimize size and performance for a particular application.

The hybrid structure of FIG. 7 may represent an adder having virtually any bit width since the number of bits per carry select adder stage can be selected to be any amount. Those skilled in the art will understand how to extend the structures of FIGS. 4 and 7 to a hybrid adder of any size.

The particular equations previously used to describe the logical operations performed by the CLA blocks 32 (i.e., equations 10–13) are representative of equations which may be used to conclude that a G output signifies a carry will definitely occur at bit i while a P output signifies a carry at bit i only if there is a carry at the previous stage at a certain bit position.

It would be understood by those skilled in the art that the CLA blocks 32 and stages 42–46 can be combined or simplified in any manner to provide the required logical operations, and the physical layout depicted in FIG. 7 was chosen for simplicity. For example, the portion of the carry tree structure shown in prior art FIG. 3C, formed of blocks B, may be substituted for the carry tree 50 shown in FIG. 7. Each block A in FIG. 3C would then be replaced by a carry select adder stage 42–46 shown in FIG. 7 such that the C0 and C1 outputs of each stage 42–46 are connected to the G and P inputs of respective blocks B in FIG. 3C.

Further, as described with respect to FIG. 3, the outputs of CLA blocks 32 in alternate stages and the outputs of alternate blocks 30 in each carry select adder stage 42–46 may be left inverted and applied to inverting input terminals of the next stage or block to reduce the number of inverters used in each block 30 or 32 in order to increase speed.

Figure 8:
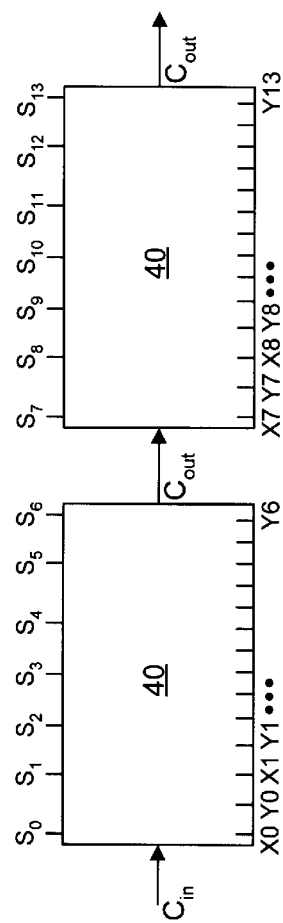
FIG. 8 illustrates how two or more discrete hybrid adders can be connected in series.

FIG. 8 illustrates how two or more discrete hybrid adders 40 may be connected in series to form an adder of any bit width. A carry output of the first adder is applied to a carry input for the next adder. Such a serial connection of hybrid address reduces the overall complexity and size of the adder as compared to a single hybrid adder of the same bit width but is slower.

Selection of Stage Lengths and Implementation of Hybrid Adder

In general, the choice of the stage lengths for each carry select adder stage in the hybrid adder should be dependent upon the input arrival times of the X and Y bits and the desired delay of the adder. Therefore, the stage lengths can be made the same size or have different sizes, depending on a particular application. In general, for uniform input arrival times, the stages are the same size or, if there is a significant CLA portion delay, get progressively longer from the least significant bit (LSB) to the most significant bit (MSB) to optimize speed vs area.

The stage lengths can be made non-uniform to handled skewed arrival times of the inputs. The slower bits are connected to the short stages, while the faster bits are connected to the longer stages, to equalize the delays. For such a case, the use of the hybrid adder reduces both the delay for the critical inputs and the area required for the adder for a selected overall delay.

The hybrid adder structure may be formed of circuit building blocks similar to those already used to form CLAs and carry select adders. Hence, one skilled in the art, after reading this disclosure, can create a logic synthesis program for implementing a hybrid adder having the desired number of carry select adder stages and bit widths of each stage, as specified by the user of the program.

The resulting hybrid adder formed using a logic synthesis tool may then be implemented in hardware by well known tools which convert the digital representation of the adder into one or more masks for forming the adder in silicon. Such masks may consist of a metallization mask for programming the metal layer on a gate array. One such gate array which may be used to implement the hybrid adder is described in U.S. Pat. No. 5,289,021, incorporated herein by reference.

A method for determining the stage lengths in the carry select adder portion of the hybrid adder will now be described with respect to the flowchart of FIG. 9. The following algorithm for choosing the stage lengths will provide performance and area improvements for the hybrid adder, especially when the bits to be added have non-uniform input arrival times. The hybrid adder design starts with the fastest and largest design and is progressively modified to optimize the speed vs. area of the hybrid adder for a particular application. The adder will automatically get smaller as the performance (speed) decreases.

In step 91, the desired overall speed of the hybrid adder in adding binary numbers having a bit width of n bits is identified. In step 92, the number (K) of carry select adder stages is set to n (start fast). In step 93, the desired stage delay (SD) for each stage is set to 0 ns. This sets each stage to initially be one bit wide.

In step 94, a timing analysis is performed to determine estimated stage delay of each stage using current stage lengths, taking into account relative arrival times of the incoming bits into each stage. In step 95, the length of any stage is increased if the estimated delay of the stage (including relative arrival time delays of the incoming bits into the stage) does not exceed SD.

In step 96, the algorithm determines whether the realized overall speed, including the carry tree operations, of the hybrid adder in calculating the final sum bits exceeds or does not exceed the desired speed. If the overall realized speed does exceed the desired speed (e.g., yes), the algorithm proceeds to step 97. If the overall realized speed does not exceed the desired speed (e.g., no), the algorithm proceeds to step 96.

In step 97, the design of the hybrid adder is finalized and the algorithm ends. In step 98, however, the desired stage delay (SD) is increased by a delta time (DT) (usually one block 30 (FIG. 4) delay), and the algorithm proceeds back to step 94 for performing a timing analysis and adjusting each stage length.

Each iteration will reduce the size of the hybrid adder. Increasing the length of a stage does not necessarily decrease the overall speed of the hybrid adder, due to the non-uniform input arrival times of the bits. The algorithm attempts to equalize the delays of the $G_{in}$ and $P_{in}$ signals entering the carry tree 50 from the carry select adder stages 42–46, while optimizing the speed and area of the adder for a particular application. If an input arrives early, it goes into a longer carry select adder stage to slow it down. Later arriving inputs go into shorter, faster stages. Longer stages reduce the size of the carry tree 50. The longer stages have the added benefit of reducing the number of G, P pairs entering the carry tree and hence actually reduce the delay through the entire adder from the latest arriving inputs.

The step 96 above may be modified to cause the "quit" criteria to be met if the overall performance exceeds the desired performance by less than a specified amount. Also, the initial stage lengths in step 92 can be set to be greater than one bit to reduce the number of iterations.

Alternatively, all stage lengths can be set to an initial length and then adjusted up or down to optimize speed vs. area.

In another embodiment, the stage lengths are initially set to be large (i.e., number of stages are small), and the stage lengths are progressively reduced to increase the speed of the adder until the speed requirements are met. This is similar in concept to the method of FIG. 9 which progressively slows down the adder instead of progressively speeding up the adder. FIG. 10 is a flowchart illustrating this concept.

In step 101, the algorithm identifies the desired delay of the hybrid adder in adding binary numbers of n bits. In step 102, the number of stages are set to an initial number to start with a slow but small hybrid adder. In step 103, the desired stage delay (SD) is set to be an initially high delay (e.g., 7 ns). In step 104, the estimated stage delay of each stage is determined using current stage lengths, taking into account relative arrival times of bits being applied to stages. In step 105, the length of a stage is decreased by one bit, and new stages are added as necessary, if the delay of that stage, including relative arrival time of bits, exceeds SD.

In step 106, If the realized overall delay of the hybrid adder is still greater than the desired delay, the algorithm proceeds to step 108. In step 108, SD is decreased by a delta time (DT) and the algorithm proceeds back to step 104. In step 106, If the realized overall delay of the hybrid adder is still not greater than the desired delay, the algorithm proceeds to step 107. In step 107 the design of the hybrid adder is finalized.

Figure 9:
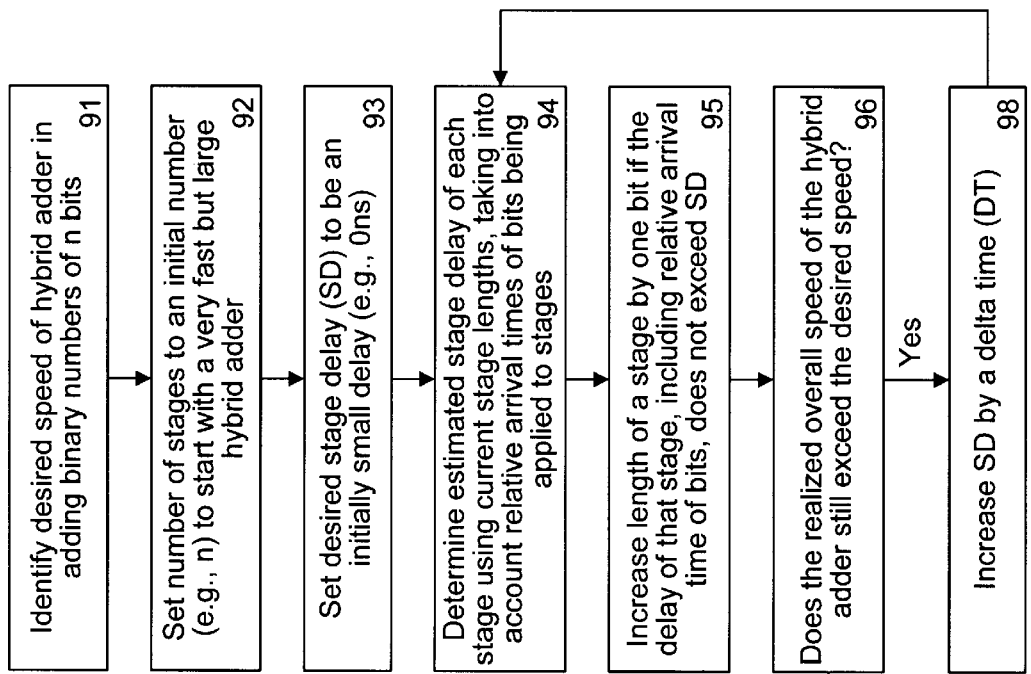
FIG. 9 is a flowchart illustrating one method for designing the hybrid adder.
Figure 10:
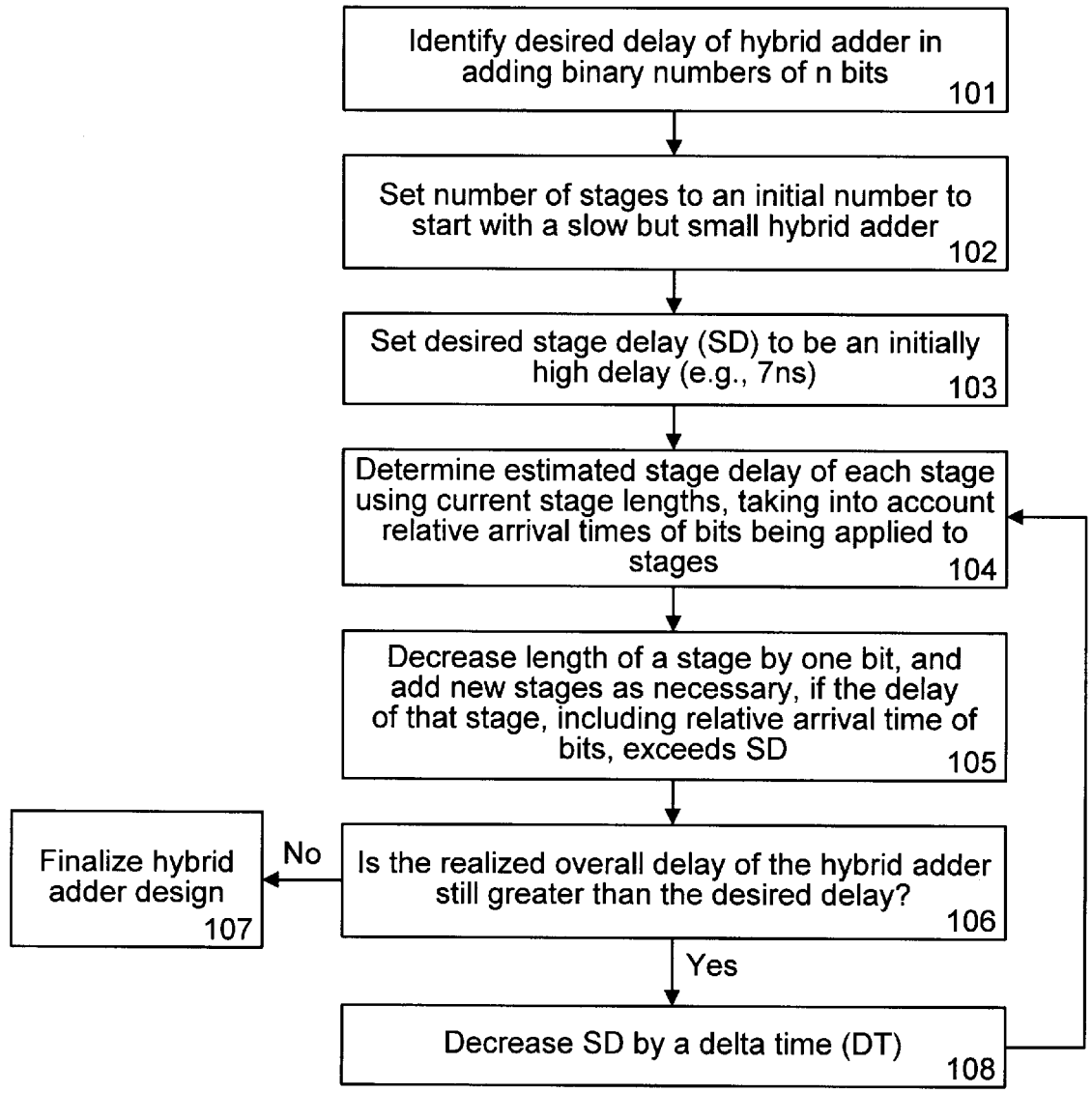
FIG. 10 is a flowchart illustrating another method for designing the hybrid adder.

It should be appreciated that the algorithms described with respect to FIGS. 9 and 10 may be a subroutine in a logic synthesis program used to form adders and other circuits.

Figure 11:
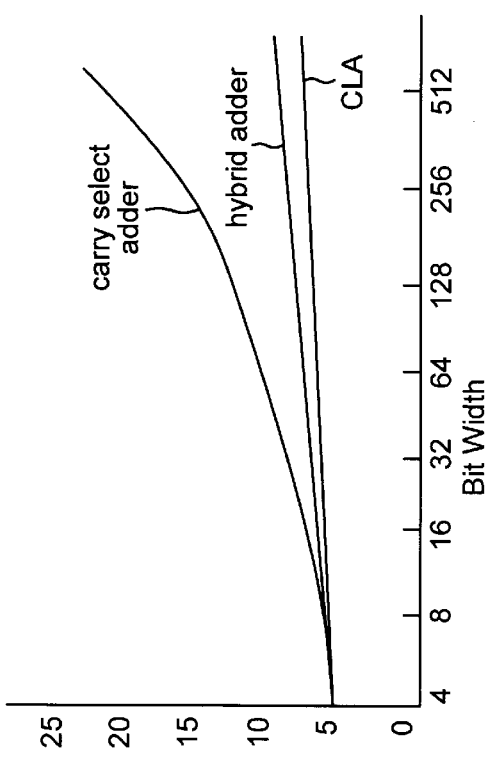
FIG. 11 is a graph of Adder Delay vs. Bit Width for a pure CLA, a pure carry select adder, and the hybrid adder of the present invention.

FIG. 11 is a graph of Adder Delay vs. Bit Width for a pure CLA, a pure carry select adder, and the inventive hybrid adder. These curves are simplified to show the general relationship between the three types of adders. It can be seen that the CLA and the hybrid adder provide a logarithmic delay, while the carry select adder provides a delay proportional to the square root of the bit width and, hence, performs poorly for large bit widths.

Figure 12:
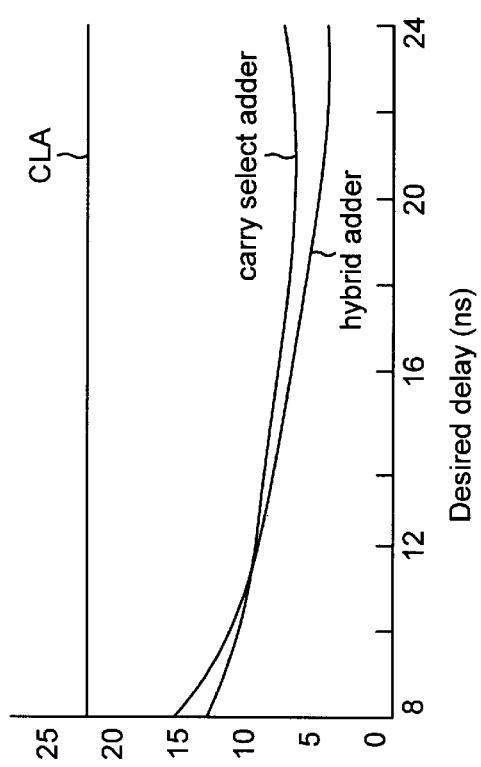
FIG. 12 is a graph of Adder Area per Bit vs. Desired Delay for a pure CLA, a pure carry select adder, and the hybrid adder of the present invention.

FIG. 12 is a graph of Adder Area per Bit vs. Desired Delay for the three types of adders. The Adder Area per Bit is given in unit sections on a die. This graph is intended to illustrate the basic advantages of each of the three types of adders. The CLA shows a constant area per bit for a desired delay. For an actual CLA, the overall delay of the CLA is relatively fixed for a wide range of bit widths, so the range of desired delays shown in FIG. 12 as it applies to the CLA may not be achievable. In any event, the Adder Area per Bit vs. Desired Delay of the CLA indicates that it has the largest area per bit of the three adders. The Adder Area per Bit vs Desired Delay of the hybrid adder shows that it is an area-inefficient design for a very fast adder, for example, having a delay under 10 ns. However, above a delay of about 10 ns, the hybrid adder design generally becomes more area efficient than the pure carry select adder for a range of desired delays.

Accordingly, each of the three adders identified in FIGS. 11 and 12 have advantages over one another given certain speed and area parameters; however, the hybrid adder has been shown to have various advantages over the CLA and carry select adders which will best satisfy the needs of designers in certain adder applications.

It is believed that the main advantage of the hybrid adder is its flexibility in being custom tailored for a set of bits having non-uniform arrival times and where there are area constraints on the adder.

Figure 13:
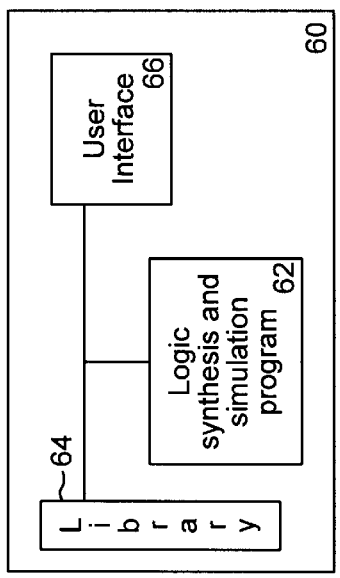
FIG. 13 illustrates a programmed computer for performing logical synthesis and simulation of the hybrid adder.

FIG. 13 illustrates a programmed computer 60 which is programmed with a logic synthesis software program used to perform timing analyses, synthesize, and simulate the hybrid adder structure described herein in response to instructions provided by the user. The resulting hybrid adder in digital form may then be transformed into one or more masks for forming the hybrid adder in silicon using well known techniques. In FIG. 13, the user interfaces with the logic synthesis and simulation program 62 and library 64 via a user interface 66 which consists of a monitor and keyboard. The program may be menu driven to effectively guide the user through the design of the hybrid adder by presenting options to the user. Alternatively, the hybrid adder design process may be automated, where the optimum design is automatically determined based on the requirements of the other circuitry on the chip and global constraints.

The library 64 contains circuit building blocks and their performance parameters for simulation. The logic synthesis and simulation program 62 interconnects the circuit building blocks and performs simulation on the synthesized circuits. Those skilled in the art of logic synthesis tools will be able to modify existing programs to create the programs shown in FIG. 13. A logic synthesis system for background purposes is described in the article *MIS: A Multiple-Level Logic Optimization System*, by R. Brayton et al., IEEE Transactions on Computer-Aided Design of Integrated Circuits, CAD 6(G), pages 1062–1081, November 1987, incorporated herein by reference.

The algorithms previously described for determining the stage lengths of the carry select adder portion of the hybrid adder may be performed automatically by the logic synthesis program after the required parameters (e.g., desired overall speed and bit width) for the adder have been established. The logic synthesis program may define the required parameters for the adder or the user of the program may input the required parameters.

While particular embodiments of the present invention have been shown and described, it will be obvious to those skilled in the art that changes and modifications may be made without departing from this invention in its broader aspects and, therefore, the appended claims are to encompass within their scope all such changes and modifications as fan within the spirit and scope of this invention.

What is claimed is:

1. An integrated circuit logic device, comprising:

a hybrid adder;

a plurality of stages of carry select functions included in said hybrid adder, said plurality of stages adapted to provide a plurality of serial carries;

a plurality of carry look-ahead tree structures included in said hybrid adder, said plurality of carry look-ahead structures for computing a plurality of final carries in parallel; and said plurality of stages adapted to be adjustably sized and said plurality of carry look-ahead tree structures adapted to be sized such that said hybrid adder optimizes an overall speed of said hybrid adder versus an overall integrated circuit area of said hybrid adder.

2. A method of selecting optimum stage lengths in designing a hybrid adder, the method comprising the steps of:

a) identifying a desired speed of a hybrid adder in adding binary numbers having a number of bits;

b) setting a number of stages of said hybrid adder to an initial number such that an initial design of said hybrid adder operates at a first speed wherein said first speed is faster than said desired speed;

c) setting a desired stage delay for each of said number of stages to an initial delay;

d) determining an estimated stage delay for each of said number of stages;

e) increasing the length of at least one of said number of stages if a delay of said at least one stage does not exceed said desired stage delay;

f) determining whether an overall speed of said hybrid adder exceeds said desired speed;

g) increase said desired stage delay by a delta time if said overall speed exceeds said desired speed; and h) finalizing said hybrid adder when said overall speed does not exceed said desired speed.

3. A method of selecting optimum stage lengths in designing a hybrid adder, the method comprising the steps of:

a) identifying a desired delay of a hybrid adder in adding binary numbers having a number of bits;

b) setting a number of stages of said hybrid adder to an initial number such that an initial design of said hybrid adder operates at a first speed wherein said first speed is slower than said desired speed;

c) setting a desired stage delay for each of said number of stages to an initial delay;

d) determining an estimated stage delay for each of said number of stages;

e) decreasing the length of at least one of said number of stages if a delay of said at least one stage exceeds said desired stage delay;

f) determining whether an overall delay of said hybrid adder exceeds said desired delay, and h) finalizing said hybrid adder when said overall delay does not exceed said desired delay.

* * * * *

UNITED STATES PATENT AND TRADEMARK OFFICE
CERTIFICATE OF CORRECTION

PATENT NO.      : 5,898,596
DATED           : April 27, 1999
INVENTOR(S)   : Peter Ruetz It is certified that error appears in the above-identified patent and that said Letters Patent is hereby corrected as shown below:

<u>Title page,</u>
Item [22], Filed: January 23, 1997

Signed and Sealed this

Twenty-third Day of July, 2002

*Attest:*

*Attesting Officer*

JAMES E. ROGAN
*Director of the United States Patent and Trademark Office*